Patented Aug. 7, 1923.

1,464,079

UNITED STATES PATENT OFFICE.

MAX ALBERT KUNZ, OF MANNHEIM, GERMANY, ASSIGNOR TO BADISCHE ANILIN & SODA FABRIK, OF LUDWIGSHAFEN-ON-THE-RHINE, GERMANY, A CORPORATION OF GERMANY.

PRODUCTION OF VAT COLORING MATTERS.

No Drawing.  Application filed December 11, 1922. Serial No. 606,266.

*To all whom it may concern:*

Be it known that I, MAX ALBERT KUNZ, citizen of Switzerland, residing at Mannheim, Germany, have invented new and useful Improvements in the Production of Vat Coloring Matters, of which the following is a specification.

This invention relates to the production of new vat coloring matters of the benzanthrone series.

It has been found that new derivatives of dibenzanthrone are produced by acting on dibenzanthrones with hydroxylamine which new derivatives dye valuable gray or black shades with a bluish tinge and an excellent fastness.

The invention is further illustrated by the following examples showing some ways of effecting the reaction but the invention is not limited thereto. The parts are by weight.

*Example 1.*

100 parts of dibenzanthrone (see Patent 818,992) are dissolved, whilst stirring, in 2000 parts of concentrated sulfuric acid of 66 degrees Baumé. After adding 39 parts of hydroxylamine sulfate the mixture is heated, within one and a half or two hours, to 165 degrees centigrade and the temperature is kept for another three quarters of an hour at 165 degrees to 170 degrees centigrade. When cold, the solution is poured into water, the precipitate is filtered off and washed with water.

*Example 2.*

100 parts of dibenzanthrone are dissolved in 2000 parts of sulfuric acid of 66 degrees Baumé, 42 parts of hydroxylamine chlorhydrate and 110 parts of copperas are then added and the whole is heated, for two hours, at 165 degrees to 170 degrees centigrade, whilst stirring. The product is then worked up as described in the foregoing example.

*Example 3.*

Into a solution of 100 parts of dibenzanthrone in 2000 parts of sulfuric acid of 66 degrees Baumé, 56 parts of hydroxylamine sulfate and 50 parts of copperas are introduced whilst stirring. The mixture is then gradually heated, in the course of two hours, to 160 degrees centigrade and kept at this temperature for an additional hour. When cool, the product is worked up as described in example 1.

The dyestuffs obtained according to either of the foregoing examples dye cotton from a violet-colored hydrosulfite vat, violet shades which on washing and exposing to the air become bluish gray; or, when dyed with higher percentages, dark gray or even deep bluish black shades are produced.

The dyestuffs are practically insoluble in almost all organic solvents, even in those of high boiling point; in boiling pyridine they are more easily soluble giving blue solutions with an intensely red fluorescence. In concentrated sulfuric acid the dyestuffs dissolve with a violet color which turns more bluish on addition of formaldehyde. The dyestuffs dissolved in sulfuric acid take up a small amount of nitrous acid, the violet solution turning blue or bluish green. The dyestuff isolated from this solution dyes cotton with a more bluish tinge.

Instead of hydroxylamine, electrolytically reduced nitric acid may be employed.

I claim:

1. As a new article of manufacture, a vat coloring matter of the dibenzanthrone series which dyes cotton from a violet hydrosulfite vat bluish gray or, when employed in higher percentages, bluish black shades of excellent fastness, which product is practically insoluble in most solvents but dissolves in boiling pyridine with a blue color and an intensely red fluorescence and which, when dissolved in sulfuric acid takes up a small amount of nitrous acid.

2. The process of manufacturing a new dyestuff of the dibenzanthrone group which consists in causing hydroxylamine to react with a dibenzanthrone body.

3. The process of manufacturing a new dyestuff of the dibenzanthrone group which consists in heating dibenzanthrone, in the presence of concentrated sulfuric acid, with hydroxylamine sulfate.

In testimony whereof I have hereunto set my hand.

MAX ALBERT KUNZ.